Jan. 25, 1927. 1,615,695
J. G. GRATTAN
JOINT BREAKING APPARATUS
Filed Nov. 18, 1924
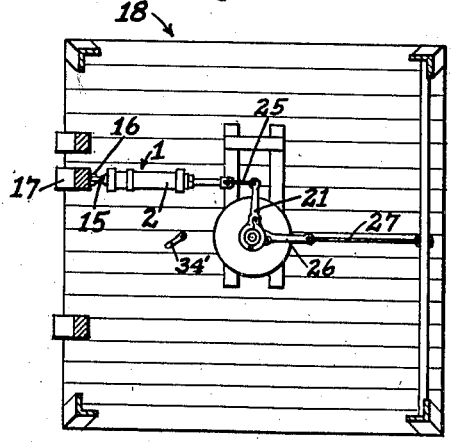
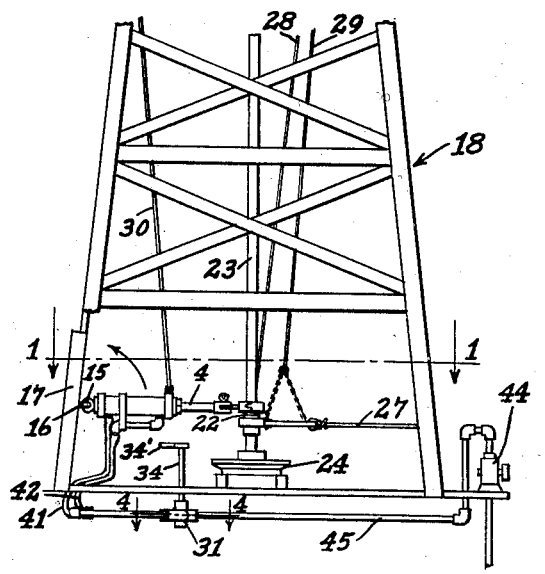
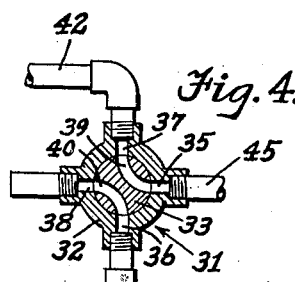
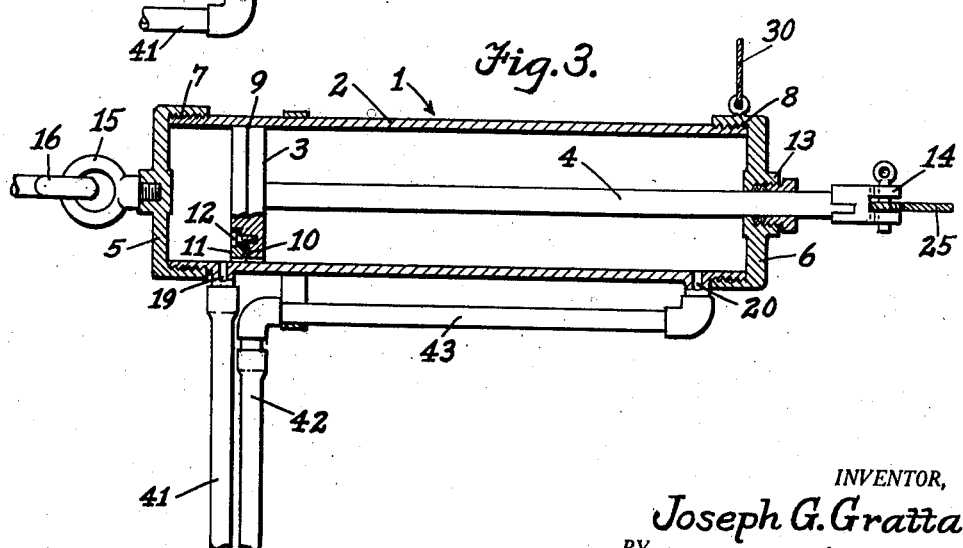
INVENTOR,
Joseph G. Grattan
BY
ATTORNEY.

Patented Jan. 25, 1927.

1,615,695

UNITED STATES PATENT OFFICE.

JOSEPH G. GRATTAN, OF LONG BEACH, CALIFORNIA, ASSIGNOR, BY MESNE ASSIGNMENTS, TO TEXAS IRON WORKS SALES CORPORATION, OF HOUSTON, TEXAS, A CORPORATION OF TEXAS.

JOINT-BREAKING APPARATUS.

Application filed November 18, 1924. Serial No. 750,522.

My invention relates to power apparatus for "breaking" or loosening the joints of rotary drill pipe used in drilling oil wells.

In the present practice of manually breaking drill pipe joints by the use of a breaking line, many accidents occur resulting in loss of arms and other injuries to the operatives. Moreover, the old method requires considerable time and labor and the breaking lines are short lived so that considerable expense is involved in replacing them.

The general object of my invention is to provide an effective, quick and safe power actuated means for breaking drill pipe joints.

Among the objects of the invention are the elimination of breaking lines, speed of operation, saving of time and labor, reduction in cost of equipment, the holding of the "pin" of the joint while the "box" is rotated off.

Other objects and advantages will appear hereinafter and while I show herewith and will describe a preferred form of construction, I desire to be understood that I do not limit my invention to such preferred form but that various changes and adaptations may be made therein without departing from the spirit of my invention as hereinafter claimed.

In the drawing:

Fig. 1 is a horizontal section of a rotary oil well rig and derrick taken on line 1—1 of Fig. 2 showing my "breaking" apparatus in plan applied to one of the tongs gripping a drill pipe joint.

Fig. 2 is a side view of the rig, derrick and my apparatus as shown in Fig. 1.

Fig. 3 is a longitudinal section of my "breaking" apparatus.

Fig. 4 is a horizontal section of the operating valve of my apparatus taken on line 4—4 of Fig. 2.

My invention comprises a breaking gun 1, which includes a cylinder 2, a piston 3 and a piston rod 4. The heads 5 and 6 of the cylinder are screw seated on the ends of the cylinder as indicated at 7 and 8. A packing ring 9 is interposed between the piston 3 and the interior of the cylinder 2 and said packing ring is bent inwardly at 10 and clamped upon the piston by a clamp ring 11 which engages the inwardly bent portion 10 of the packing ring and is secured to the piston by screws 12. The piston rod 4 projects through a stuffing box 13 in the cylinder head 6 and has a clevis 14 on its outer end. An eye 15 is fixed in the cylinder head 5 and an eyebolt 16 extends through said eye, which eyebolt is secured in the hoist mechanism frame 17 on an oil well derrick 18.

The cylinder 1 is provided with ports 19 and 20 near its ends. Tongs 21 are applied to the pin of a joint 22 of the drill pipe 23 above the rotary 24, which pipe is hoisted out of the well through said rotary, which is located in the base of the derrick 18. One end of a cable 25 is connected to the clevis 14 on the piston rod 4 and the other end of said cable is connected to the outer end of the handle of the tongs 21.

Tongs 26 are applied to the box of the joint 22 and the outer end of said tongs is connected to one end of a cable 27, the other end of said cable being connected to the derrick 18 to support the tongs so that they will hold the box against turning. The tongs 21 and 26 are suspended on cables 28 and 29 respectively secured in the upper part of the derrick. The inner swinging end of the gun 1 is suspended on a cable 30 secured in the upper part of the derrick.

A control valve 31 is located under the floor of the derrick 18, which valve comprises a valve casing 32 and a valve plug 33, the plug being fixed to a rod 34 upstanding from the valve through the derrick floor.

A handle 34' is fixed to the upper end of rod 34 for turning said rod and plug. The valve casing 32 is provided with an inlet port 35, ports 36 and 37 and an exhaust port 38. The valve plug 33 is provided with ports 39 and 40.

A hose 41 connects the cylinder port 19 and the valve port 36 and a hose 42 and pipe 43 connects the cylinder port 20 and the valve port 37, the hose 41 and 42 being held parallel together intermediate their connecting ends. A pump 44 is mounted on the floor of the derrick and a pipe 45 leads from the outlet of the pump into the inlet 35 of the valve 31.

To "break" or loosen a joint 22 of the drill tubing 23, the tongs 21 and 26 being applied to the pin and box respectively of the joint, the plug 33 of valve 31 is turned so that plug port 39 registers with inlet port 35 and port 37 and the plug port 40 registers with port 36 and exhaust port 38.

Water is then pumped by pump 44 through pipe 45, inlet port 35, plug port 39, hose 42, pipe 43 and cylinder port 20 into the right end of the cylinder 2, which forces the piston 3 and the rod 4 to the left, whereupon the tongs 21, through cable 25, are drawn with a quick movement in a counter clockwise direction, the tongs 26 holding the "box" of the joint 22 stationary, and the "pin" of the joint is loosened from the "box", thus "breaking" the joint.

Any water in the left end of the cylinder is forced by the piston out through port 19, hose 41, port 36, plug port 40 and exhaust 38.

The tongs 21 and the "pin" being held turned slightly counter clockwise with the joint "broken" and the tongs 26 being released from the box, the lower portion of the drill tubing 23 is rotated by the rotary 24 in a clockwise direction until the joint 22 is unscrewed. The tongs 21 are then released from the pin of the joint.

The valve plug 33 is then turned until the plug port 39 registers with the inlet port 35 and with port 36 and the plug port 40 registers with port 37 and exhaust port 38, whereupon water is pumped through inlet port 35, plug port 40, port 36, hose 41 and cylinder port 19 into the left end of the cylinder 2, which forces the piston 3 and rod 4 to the right into position for "breaking" another joint, while the piston forces the water out of the other end of the cylinder through port 20, pipe 43, hose 42, port 37, plug port 39 and exhaust port 38.

When not in use the gun 1 may be swung upwardly out of the way on its eye 15 by cable 30.

Having thus described my invention, I claim:

1. In a rotary oil well rig, having means for gripping the pin, and box of a joint of the drill pipe, a breaking gun swingingly mounted at one end in the lower part of the oil well derrick, the free end of the gun being suspended on a cable in the derrick, the gun being connected to one of said gripping means for breaking the joint, said cable being adapted to swing the free end of the gun upwardly, and said gun being thereby movable to a position more nearly vertical than horizontal when not in use.

2. In a rotary oil well rig, a breaking gun containing a piston, a pivotal support located at one end of said gun to connect said gun with the well rig, means for gripping the pin and box of a drill pipe, means to connect operatively the free end of said gun with said gripping means, hose to supply fluid pressure to operate the piston of said gun, said hose permitting said gun to swing on said pivotal support, and a cable to support said gun in a substantially horizontal operative position, said cable being adapted to swing said gun up toward the side of the well rig when said gun is not in use.

3. In an oil well rig having gripping means applied to the pin and box of a drill pipe joint, a gun comprising a cylinder, a piston head and piston rod for said cylinder, means for flexibly and detachably connecting the outer end of said piston rod with said gripping means, an eye and eyebolt pivotally connecting the other end of said gun to the frame of the well rig, and means to support said gun in a substantially horizontal operative position, and to swing said gun on its eyebolt to a relatively upright inoperative position.

4. A draw works attachment including gripping means adapted to be applied to the pin and box of a drill pipe joint, a breaking gun adapted to be swingingly mounted at one end in the lower part of the oil well derrick, yieldable means for suspending the free end of the gun, said gun being connected to one of said gripping means for breaking the joint, said suspending means being adapted to sustain the gun in approximately horizontal position but permitting the position of said gun to vary relative to normal position.

5. A draw works attachment including gripping means adapted to be applied to the pin and box of a drill pipe joint, a breaking gun adapted to be swingingly mounted adjacent the lower part of the oil well derrick, yieldable means for sustaining the free end of the gun, said gun being connected to one of said gripping means for breaking the joint, said suspending means being adapted to sustain the gun in approximately horizontal position but permitting the position of said gun to vary relative to normal position.

JOSEPH G. GRATTAN.